(12) United States Patent
Lakey

(10) Patent No.: US 7,672,581 B2
(45) Date of Patent: Mar. 2, 2010

(54) CAMERA COMPOSITION GUIDE

(76) Inventor: James B. Lakey, 1905 Beech Cove Dr., Cleveland, TN (US) 37312

(*) Notice: Subject to any disclaimer, the term of this patent is extended or adjusted under 35 U.S.C. 154(b) by 632 days.

(21) Appl. No.: 11/475,678

(22) Filed: Jun. 27, 2006

(65) Prior Publication Data

US 2007/0065136 A1  Mar. 22, 2007

Related U.S. Application Data

(60) Provisional application No. 60/758,089, filed on Jan. 11, 2006, provisional application No. 60/717,951, filed on Sep. 16, 2005, provisional application No. 60/649,750, filed on Jun. 28, 2005.

(51) Int. Cl.
*G03B 17/20* (2006.01)
(52) U.S. Cl. .................. 396/296; 348/333.03
(58) Field of Classification Search .............. 396/296; 348/333.03
See application file for complete search history.

(56) References Cited

U.S. PATENT DOCUMENTS

| | | | | |
|---|---|---|---|---|
| 4,367,463 A * | 1/1983 | Suzuki et al. | ................. | 345/9 |
| 5,111,228 A * | 5/1992 | Hansen | ................. | 396/381 |
| 5,687,408 A * | 11/1997 | Park | ................. | 396/271 |
| 5,873,007 A * | 2/1999 | Ferrada Suarez | ............ | 396/296 |
| 6,462,871 B1 * | 10/2002 | Morishima | ................. | 359/463 |
| 6,714,244 B1 * | 3/2004 | Takebayashi et al. | .. | 348/333.02 |
| 6,806,906 B1 * | 10/2004 | Soga et al. | ............ | 348/333.03 |
| 2003/0206240 A1 * | 11/2003 | Hyodo et al. | .......... | 348/333.03 |
| 2005/0146631 A1 * | 7/2005 | Shelton et al. | ......... | 348/333.12 |

* cited by examiner

*Primary Examiner*—Melissa J Koval
*Assistant Examiner*—Fang-Chi Chang
(74) *Attorney, Agent, or Firm*—Stephen J. Stark; Miller & Martin PLLC

(57) ABSTRACT

A camera and camera insert having an improved crop area either on a crop guide or otherwise provided on a display. The composition guide can be molded into the insert, such as a camera screen, or alternatively printed or painted thereon. The crop area can be horizontal and/or vertically oriented and/or provide an ability to identify both 8×10 as well as wallet sized images depending upon the embodiment utilized.

13 Claims, 3 Drawing Sheets

CAMERA COMPOSITION GUIDE

CLAIM OF PRIORITY

This application claims the benefit of U.S. Provisional Patent Application Nos. 60/717,951 filed Sep. 16, 2005, 60/649,750 filed Jun. 28, 2005, and 60/758,089 filed Jan. 11, 2006.

FIELD OF THE INVENTION

The present invention relates to camera composition guides, and more particularly to digital camera composition guides for use in assisting a photographer to obtain an image which provides the photographer with an advanced indication when looking through a viewer of how an image is likely to print and/or an aid to assist in composing the printed image.

DESCRIPTION OF RELATED ART

Digital cameras are principally manufactured in Japan. The Japanese favor an 8×12 format instead of an 8×10 format which is popular in the United States. The digital sensors typically capture and display an 8×12 image. This created need a number of years ago for the applicant to provide camera screen composition guides for photographers to see how an 8×10 and other format images would be composed without requiring extensive manipulation during the printing process. These prior art guides were formed by diamond or metal etching camera screens. FIG. 1 shows a prior art 8×10 composition guide.

The prior art etching process received and continues to receive very favorable response from the photography profession. The etching causes scratched lines of glass or plastic (i.e., non-transparent) to appear so that a particular area can be distinguished through the viewer. The etched lines have been cut into camera screens. Camera screens normally have two sides; a Fresnel side and a diffusion side.

Unfortunately, due to the optical path light transmission, particularly, but not limited to, the central area image, these etched lines can appear very faint and difficult to see. Accordingly, in many instances the photographer may have to jiggle the camera to attempt to be able to locate at least some of the etched lines. In other instances, part of the etched line may simply "disappear" because of the amount of light being transmitted through a particular portion of the guide.

In the landscape orientation (i.e., length is longer than the height) the camera screen originally provided with a camera is replaced with another camera screen having marked as shown in FIG. 1. In this prior art embodiment, the dimensions a×b were in a ratio of 8×10 instead of 8×12 which would be the ratio of a×c as provided by the manufacturer based on the image taken on the digital sensor. Accordingly, this prior art composition of FIG. 1 was particularly helpful in composing 8×10 images.

Although sporadic use has been made of prior art camera screen composition guides which assist in composing a 5×7 ratio which is represented by d×e in FIG. 2 and f×g in FIG. 3, these guides are utilized similarly to the guide shown in FIG. 1 in that for taking portraits the camera must be vertically oriented (i.e., turned ninety degrees) so that the "portrait" is taller than it is wide (which is how professional portraits are composed).

Accordingly, a need exists for an improved composition guide, such as ones which doesn't rely on etching which can be difficult to see under some lighting conditions.

Additionally, all known prior art composition guides by the applicant have been utilized in the same orientation as the camera. None are known to be used to compose photographs perpendicular to the direction of orientation of the camera. Additionally, no composition guide has been known by the applicant to be utilized for the purpose of effectively increasing the focal length of the lens based on a reduction of the amount of sensor data utilized.

Accordingly, there exists needs in the marketplace for improved composition guides.

Additionally, what is much more common than 5×7 images are wallet sized prints. Many professional photographers that capture images at various school dances and studios often offer packages of 8×10s together with wallet sized prints. While the prior art camera screen inserts are particularly helpful in composing 8×10 images, they are not particularly helpful in composing wallet sized images. In fact, if using the prior art device of FIG. 1, it is entirely possible to capture structure in the background which is not desired. The same holds true for using the camera screen designs of FIG. 2 and FIG. 3. Furthermore, there is no way to guess with these prior art guides what will be removed or cropped out during printing.

Additionally, with the advent of digital cameras, LCD screens are usually provided at the back of the camera and provide a way for the photographer to view an image before the image is taken and/or after the image is taken. Presently there are no known composition guides to the Applicant which assist the photographer in visualizing the printed image based on the image displayed on a display since it is typically displayed in 8×12 format.

Accordingly, a need exists for improved composition guides for use in displaying images at the viewer as well as on screens or projected image path.

SUMMARY OF THE INVENTION

It is an object of the present invention to provide an improved composition guide for use with at least one of a camera screen and/or a display such as an LCD screen or anywhere within the projected image path including the camera mirror.

It is another object of the present invention to provide a camera screen composition guide which provides an indication to a photographer as to the crop area of an image without relying on etched lines.

It is another object of the present invention to provide a composition guide for use with a camera screen which displays an image crop area with molded and/or colored lines and/or shim/spacer inserts which can also benefit controlling the correct camera focus calibration.

It is another object of the present invention to provide a camera screen composition guide which provides an indication to a photographer as to the crop area of a standard wallet sized image.

It is another object of the present invention to provide a composition guide for use with a camera screen which displays a wallet sized image crop area in addition to an 8×10 image crop area.

It is another object of the present invention to provide a camera screen composition guide which allows the photographer to maintain the camera horizontal (in a landscape view) while composing images which will be printed in a portrait fashion (i.e., vertically).

It is another object of the present invention to provide a composition guide for use with a camera screen or crop guide which allows for a predetermined increase in effective focal length of a lens connected to the camera.

It is another object of the present invention to provide a composition guide relative to a display on a digital camera.

It is another object of the present invention to correct the parallax inaccuracy design of some cameras, which do not properly display viewfinder to actual image capture areas such as proper centering alignment.

Accordingly, a presently preferred embodiment of the present invention includes a camera having a camera screen which includes at least one composition guide showing at least one crop area. A presently preferred embodiment provides at least one of a head position design crop in proportions to consistent sizing, square, a wallet sized crop area or other crop area together with a crop area of an 8×10 image. The wallet sized crop area may be centered relative to the camera screen and the 8×10 crop area. A camera of the presently preferred embodiment of the present invention could also include an LCD display which or camera mirror provides a mask or composition guide. Other crop areas such as at least one of a head positioner, sizer and centering guide, 8×10, 5×7 and/or wallet sized crop areas, or others could also be provided. In fact, an alternatively preferred embodiment provides a portrait crop area oriented to be utilized for making a portrait while the camera remains in a landscape (horizontal) mode spaced from a crop area of an 8×10 image for use with the camera in a portrait (vertical) mode. The portrait crop area (such as 8×10 shown, but could be set up for 5×7, 4×5, wallet size, etc.) is illustrated centered relative to the camera screen and the vertical 8×10 crop area, but is perpendicular to the direction of the vertical 8×10 crop area. This allows a camera to be in the landscape position while allowing a photographer to compose a desired portrait for a particular printed photograph.

These, or other composition guides could also be equipped for increasing the effective focal length of the camera. For instance, if a 50% ratio of image capture for a particular lens were utilized, half of the sensor's data capture capacity would be utilized. Although half of the capture data would be available for printing, it is often the case with the newer cameras that little, if any, problems would occur with the printed image. For instance, with a 12 Megapixel camera, utilizing about 6 Megapixels of data often results in a very good image. Of course, other portions of the possible data capacity could be utilized as well, such as 1/3, 1/4, etc. In the 50% example the composition guide could function as an effective 2× magnifier (although the total sensor data capture capability would be half of those specified by the manufacturer when utilized in such a manner).

The camera system of the presently preferred embodiment has at least one of a molded composition guide, a shim/spacer, decal or image print transfer and a printed composition guide. This differs from the prior art design wherein a diamond or metal scratched the composition guide into one side of the screen. Molded composition guides can take one of two forms. They can either be elevated relative to a surface of the screen or they can be molded into (i.e., recessed) the screen and/or they can be imprinted by a process of paint, stain or ink. Even when they are recessed into the screen, the diffusion characteristics of the screen can be taken into account whereas in the prior art the etching or cutting into the screen distorted at least locally the diffusion techniques. In other prior art embodiments etching (i.e., cutting into) a Fresnel side or diffusion side of a screen could inhibit light collection characteristics. By molding, painting, imprinting, tracing, stamping and/or inserting a shim or design composition guide into the screen, or mirror or other location in the image display path disadvantages associated with etching are believed to be alleviated.

BRIEF DESCRIPTION OF THE DRAWINGS

The particular features and advantages of the invention as well as other objects will become apparent from the following description taken in connection with the accompanying drawings in which.

DETAILED DESCRIPTION OF THE PREFERRED EMBODIMENT

Figure 5:
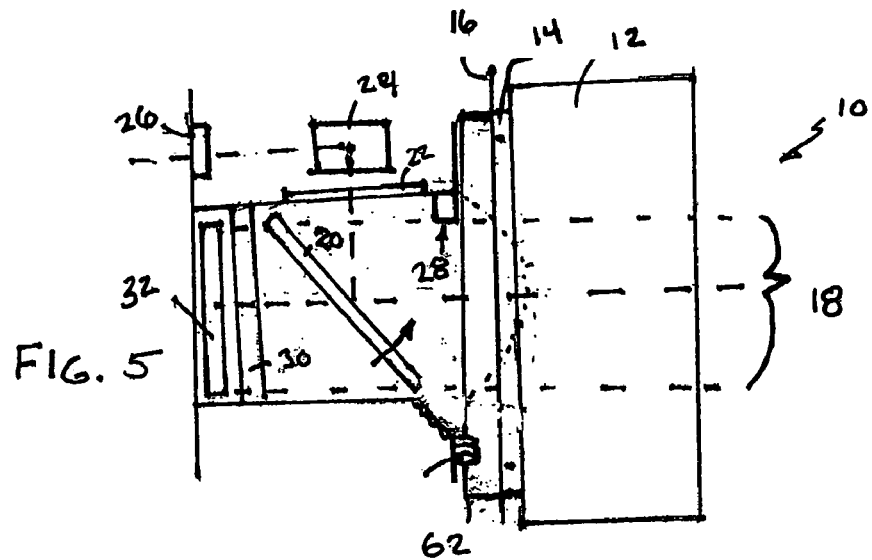
FIG. 5 is a schematic side view of a digital camera showing the camera screen of FIG. 4 installed therein.

FIG. 5 provides a schematic view of internal portions of a digital camera 10 having a lens 12 connected at a lens ring 14 at housing 16 of a camera body. As an image is received by the lens 12 having a view height as represented by dotted lines 18 the image is received through the lens 12 and normally directed onto a mirror 20 which is angled at 45 degrees relative to the perceived image and directed through camera screen 22 into pentaprism 24 or other imaging device and onto viewer 26 where the image is viewed by one using the digital camera 10.

In order to capture the image, a button is typically pressed thereby moving the mirror 20 up against stop 28 and operating the shutter 30 thereby exposing the digital sensor 32 to the image.

Figure 1:
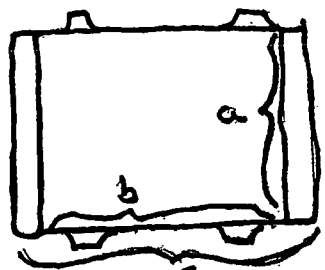
FIGS. 1-3 are prior art top plan views of camera screens having prior art composition guides thereon.
Figure 2:
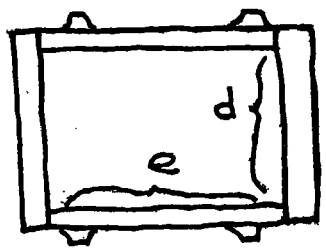
Figure 3:
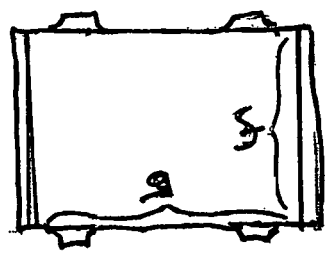

Camera screens of prior art designs are shown in FIGS. 1-3 and have been explained above as it relates to the Description of Related Art. In all these prior art designs, camera crops areas were illustrated which included areas which would not be printed on wallet sized prints, (i.e., some photographers complained that too much image area was being cut off when cropped for billfold sized prints). Additionally, all of the known prior art composition guides were utilized in the same orientation as the camera (i.e., in order to compose portraits, the camera had to be held in a portrait, or vertical, orientation)

Accordingly, a need was generated for a new tool for the photographer to compose images so that he could accurately predict the cropped image when making prints, particularly making portraits while maintaining the camera in the landscape mode. This allows a flash to remain on top as designed (instead of on the side when the camera is turned to the portrait orientation).

Figures 4A, 4B:
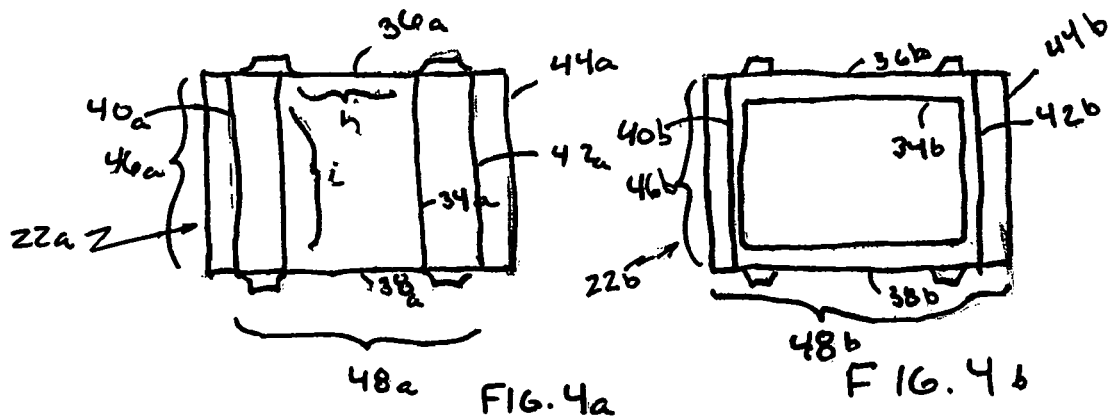
FIG. 4a is a top plan view of a camera screen with a composition guide of a first presently preferred embodiment of the present invention.
FIG. 4b is a top plan view of a camera screen with a composition guide of a second presently preferred embodiment of the present invention.

Camera screen 22a is shown in FIG. 4a of the presently preferred embodiment. The camera screen 22a includes 8×10 image area perimeter 34a which is proportioned to the size of 8×10 sized prints and functions as a crop guide. As one can see, the horizontal, or orthogonal 8×10 image area perimeter 34a is oriented ninety degrees relative to the prior art composition guide image areas.

Camera screen 22b shown in FIG. 4b of the presently preferred embodiment includes wallet sized image area perimeter 34b which is proportioned to the size of billfold or wallet sized prints, most preferably dye cut wallet sized billfold sized cropped prints. These prints have a ratio of about 2.1×3 or anywhere in the range of about (2+/−0.2)×(3+/−0.2) based on the dye cut machine tooling in use.

It is important to remember that in the prior art a crop area for an image smaller than a 8×10, namely, an 5×7 is already relies upon at least one of the boundaries of the 8×10 print for the embodiment shown in FIG. 2. FIG. 3 shows a larger area being used for the 5×7 print. This is not possible with the applicant's present invention when a significant amount of area provided in a 8×10 is not present in the wallet sized print. Furthermore, placing a boundary of the wallet sized print on one of the boundaries of the 8×10 crop area of the prior art would result in one printed image being centered and the other being noticeably off center.

The boundary perimeter 34a of the crop guide in the embodiment of FIG. 4a may, or may not, contact top 36a, bottom 38a or even 8×10 cropped lines 40a,42a or other portion. It is illustrated contacting the top 36a and bottom 38a of the camera screen 22a with the width h, and height i extending intermediate the top 36 and bottom 38. This is ninety degrees shifted from the prior art boundary perimeters. This allows the photographer the convenience of maintaining the camera in a landscape orientation while taking portraits. For newer cameras that have sensors with excellent data collection capability, the photographer has the luxury of now using a significantly smaller portion of the image capture area of the sensor and then providing a portrait.

In other embodiments, the perimeter 34b may contact one of the 8×10 cropped lines 40b,42b or one of the top 36b or bottom 38b of the camera screen 22b but not more than one in such an embodiment and in that embodiment the subject centered on one of the 8×10 and wallet sized crop area will not be centered.

An additional feature is that when only a smaller portion of the sensor is utilized, the photographer may elect to print the composed image larger (i.e., somewhat akin to zooming in with a copier). With the recent addition of camera sensors with higher image data capture (currently widely available at 10 to 12 Megapixels), printing roughly half of the capture data and printing at about 5 to 6 Megapixels at the size of a print at 10 to 12 Megapixels results in the effective doubling of the focal length of the lens placed on the camera 10. Other alternative embodiments could include utilizing more or less of the sensor data (such as ⅓ for a 3× zoom, ¼ for a 4× zoom, ⅔ for a 1.5× zoom, or any other desirable fractional amount, especially as the amount of data that sensors can capture increases).

It is additionally possible to a way to reduce the file size of the data for a picture of that within the crop area. In future cameras, it may be possible for the camera to do this directly. At this point, separate software is utilized for such capability (since a fraction of the sensor data is utilized for the printed image, the remainder of the sensor data can be discarded). This would allow varying the file sizes of images taken with a single camera.

Additionally, it is envisioned that in some embodiments one or the other the perimeter 34a for a perpendicular 8×10 or orthogonal crop area is provided. A billfold crop perimeter 34b may be centered relative to the perimeter 44b of the camera screen 22b both in terms of width 46b and length 48b as illustrated in FIG. 4b or otherwise.

In some embodiments the 8×10 crop lines 40b,42b may or may not be provided. In the embodiment as illustrated in FIG. 4a, the 8×10 crop lines 40a,42a are provided in addition to the 8×10 orthogonal perimeter 34a. This embodiment is particularly helpful for professional photographers that provide 8×10 photographs so that they can elect which orientation they will utilize their camera. Of course, the camera 10 could be turned 90 degrees between respective vertical 8×10 and horizontal 8×10 shots. This camera screen 22a allows the photographer to locate a desired image within the confines of the horizontal 8×10 perimeter 34a taken in a portrait orientation while the camera remains in a horizontal (or landscape) orientation to accurately predict how the image will be displayed when printed. This is not possible with prior art constructions.

In the embodiment as illustrated in FIG. 4b, the 8×10 crop lines 40b,42b are provided in addition to the billfold perimeter 34b. This embodiment is particularly helpful for professional photographers that provide packages above 8×10 photographs together with 5×7 or wallet sized prints of substantially the same image. This camera screen 22b allows the photographer to locate a desired image within the confines of the billfold perimeter 34b while simultaneously observing the image within the 8×10 lines 40a,42b to accurately predict how both images will be displayed when printed. This is not possible with prior art constructions.

Figure 6:
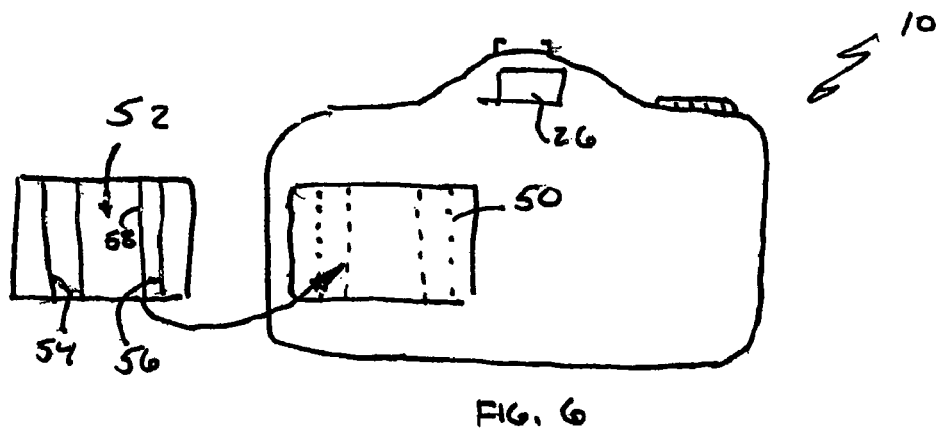
FIG. 6 is a back plan view of a digital camera showing a mask as a part of a screen or a display in accordance with the presently preferred embodiment of the present invention.

In addition to employing the camera screens 22 as shown in FIG. 4a, 4b and 5, a camera 10 of the presently preferred embodiment also includes a displayed images 50 such as an LCD display or otherwise which is utilized in at least one of two ways for most digital cameras 10 as shown in FIG. 6. First, the displayed images 50 usually displays taken images. Once again, these displayed images 50 are typically displayed in 8×12 format in the Japanese style as captured by the digital sensor 32. To date, no one is known to have provided a tool to indicate to the photographer how the image will print.

Accordingly, a mask 52 is illustrated being connected to the display 50. In one embodiment, the mask 52 is transparent except for 8×10 lines 54,56. In other embodiments areas outside the lines 54,56 or others may be shaded, painted, printed, colored, decal or image print transfer or otherwise indicated. The mask 52 may be adhered to or otherwise connected to the display. Other ways of connecting the mask 52 to the display 50 are known in the art. Furthermore, in alternative embodiments, the mask 52 may be displayed on the display 50 such as with a processor or otherwise displaying lines shaded areas, etc. In addition to providing the 8×10 lines 54,56, other composition grids may be provided as a mask 52 relative to the display 50 such as horizontal 8×10 perimeters 58, 5×7 perimeters wallet or billfold perimeters 58, or other composition grid tools such as and locations for heads for school pictures, photographs, grid lines for composing landscapes, etc. To the applicant's knowledge, no effort has been made to provide a composition guide or mask 52 for use with a display 50 for digital cameras. Furthermore, it may be that the camera user can select from a plurality of masks which may displayed.

It is important to remember that the camera screens 22,22a or 22b only affects the image to the viewer 26. The camera screen is not in the line of the image taken by digital sensor 32 and does not affect that image. Accordingly, in order to accurately predict how a composition of an image taken by the digital sensor 32 will print, the prior art replacement camera screens as shown in FIGS. 1-3 provide no assistance. Furthermore, although it might seem advantageous to provide composition guide on the viewer 26 directly, the angle of the eye relative to the viewer 26 could affect the perceived composition tool which would be undesirable. However, it may be that viewers 26 may eventually take the form of displays which would take out parallax problems and provide such an option in future generations of digital cameras.

Camera crop screens and/or display areas as shown and described herein provided for horizontal 8×10 images, but could also be made to address portraits whether 5×7, 8×10, dye cut wallet sized, billfold sized, etc. crops on camera screens and/or displays. The lines and perimeters can be etched, drawn, printed, painted, imbedded, projected, inserted, overlaid, decal or image print transfer or otherwise made to show any crop area including the cropped billfold sized dye cut print areas on camera screens, other transparent portions, and/or on displays. It is important to remember that since no crop composition guides have been employed with displays in the prior art, such tools are particularly attractive for digital camera designs.

Figure 7:
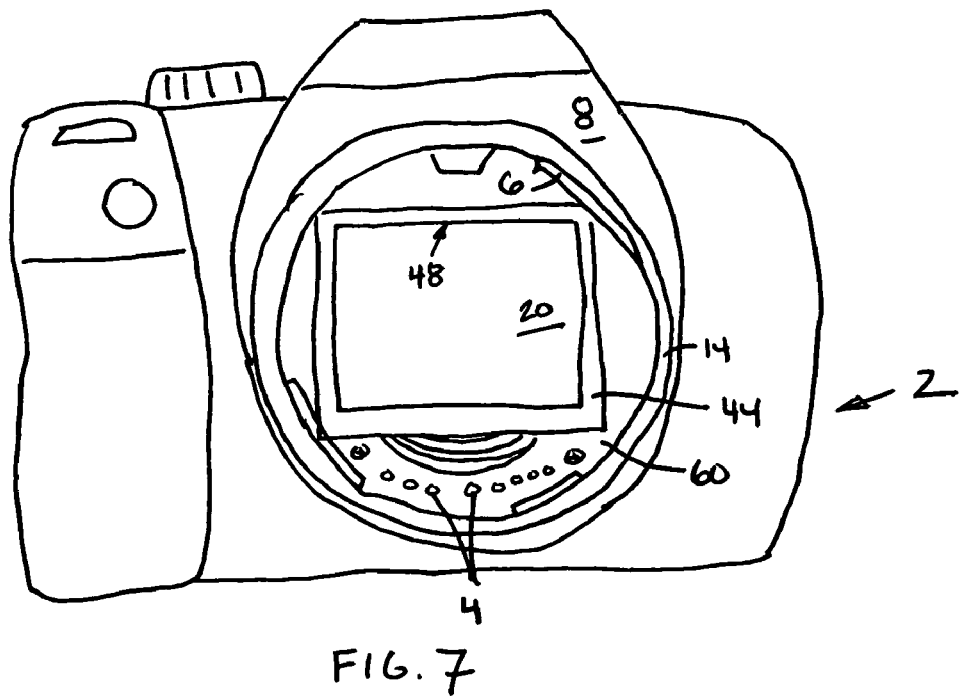
FIG. 7 shows a front view of a camera of the presently preferred embodiment.

A digital camera of the preferred embodiment has a body 2 as shown in FIG. 7. The body 2 includes a lens ring 14 with flanges 6 which allow for lens (not shown) to be twistedly connected to the lens ring 14. The lens ring 14 is typically located at an exposed portion of the body 8 (when the lenses are replaceable).

Electronic pins may cooperate with electrical connections on a lens especially in a digital camera using EF lenses or other lenses in other embodiments. The EF lenses and/or auto-focus lenses may utilize these electrical connections.

The pins 4 typically extend from a face 60. The face 60 normally surrounds a cavity or channel 44 in which a mirror 20 operates. The mirror 20 is normally positioned at a 45 degree angle but is operably coupled to move to a 90 degree angle to be in contact with a fixed position stop 48 so that the digital sensor is then in direct line with the lens (not shown) when a photograph is taken. A shutter (usually mechanical) opens and a picture is taken (i.e., recorded by the digital sensor) with the shutter in the raised position. The shutter then closes and the mirror returns to its 45 degree orientation.

FIG. 5 shows a lens 12 connected at the lens ring 14 mounted to housing 16. Shoulder 62 twists and locks into place placing electrical contacts or pins 4 (if utilized) in contact with similar electrical contacts in the lens 12 such as for auto-focus, etc., or other capabilities. When the shutter is not depressed in most cameras, the image received by the lens 12 is directed to the mirror 20 which is directed through a viewing or focusing screen 22 and a pentaprism 24 or other imaging device to a viewer 26 where the user of the camera 10 can view an image. Upon taking a picture, most mirrors 20 rotate to contact a stop 28. The mechanical shutter 30 opens thereby allowing digital sensor 32 to capture an image as received by the lens 12 with the mirror 20 out of the field of view. A maximum field of view as represented by dotted lines 18 represents a field of view received by the sensor 32 which is unobstructed by other items within the camera housing 16.

Figures 11, 12:
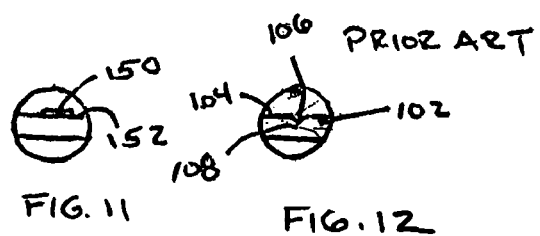
FIG. 11 is a cross-sectional view of the area marked "A" in FIG. 8 in a second alternatively preferred embodiment of the present invention.
FIG. 12 is a prior art cross-sectional view of an area similar marked "A" to the one in FIG. 8 showing diamond etching into the surface of the screen.

As can be seen from FIG. 12, in the prior art composition guides were formed on focusing screens 102 by diamond or metal etching (i.e., scratching) a first surface 104 with a diamond or metal point to create groove 106 into the surface 104. In order to perform this step, the screen 102 was held with a jig in a fixed position as the engraving tool with the diamond or metal point cut the groove 106 into the surface 104 of the screen. While this prior art etching process is getting favorable response in the photography profession, a perceived problem can exist under certain situations. Specifically, the optical path light transmission particularly, but not limited to the central area of the image, can cause the etchings to appear very faint and difficult to see. It is important to remember that the one side of the screen normally has a Fresnel side which assist in spreading light. The opposite side is usually a diffusion side which diffuses light. Accordingly, when one elects to etch either side of the screen as provided by a manufacturer, it can inhibit at least portions of either the diffusion side or the Fresnel side.

As one skilled in the art will know, the Fresnel side is a series of concentric circles which are spaced smaller as they get closer to the smallest circle at the center. This effect of spreading light has been known probably around one hundred years, if not longer.

In order to overcome the effects of the prior art which created a single sometimes distinguishable line as noted at the bottom 108 of the groove 106 having negligible width, the applicant developed a new method of making a composition screen as well as a camera screen with a composition guide as well as a camera screen with composition guide which is an improvement over the prior art design.

Figure 8:
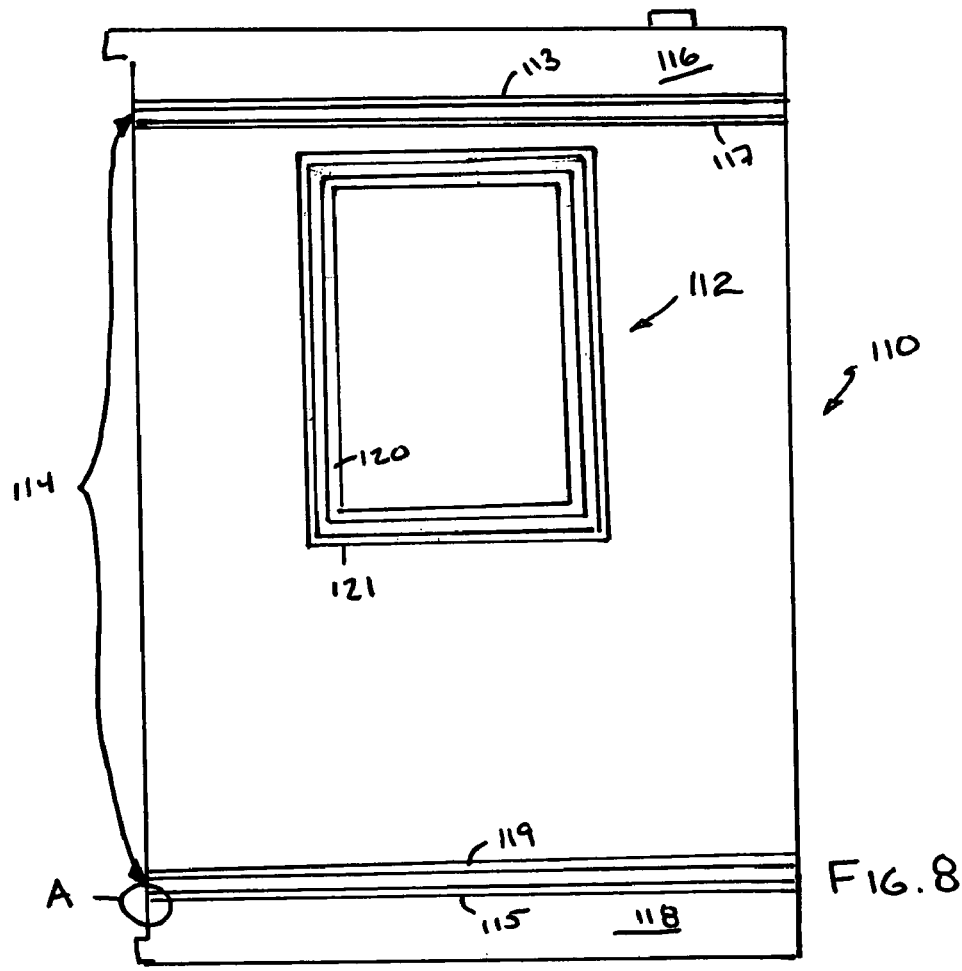
FIG. 8 shows a camera screen of the presently preferred embodiment from a top view.

Specifically, FIG. 8 shows a camera screen 110 having two guides 112 and 114. Guide 112 is utilized to place the head of an individual for such activities as yearbook photos so that all of the individuals fill the image to the same degree when made. Second guide 114 is utilized to show the photographer what the cropped image of an 8×10 image is likely to be printed. Areas 116 and 118 will not be printed with a centered image on 8×10 paper since almost all digital cameras employ the 8×12 sensor format commonly utilized in Japan and in other countries.

Figure 10:
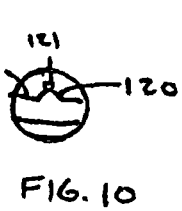
FIG. 10 is a cross-sectional view of the area marked "A" in FIG. 8 in a first preferred embodiment of the present invention.

FIG. 10 shows a preferred embodiment of the present invention. Specifically, the an insert in the form of a camera screen 110 is molded with the composition guides 112,114 as a part of it. The screens 110 are normally plastic or glass, but could be made of other translucent and/or transparent materials. Additionally screens 110 could have other sides other than a Fresnel side and a diffusion side, they could be substantially transparent, or otherwise, in some embodiments. The composition guides could be provided with replacement shims, such as those to correct focus, or other inserted devices intermediate the lens 12 and the viewing device illustrated as a viewer 426.

In FIG. 10 the first composition guides line 120 is illustrated having the elevation above surface 122. This is clearly distinguishable from the prior art design of FIG. 12 in that it has an elevational element to it. Furthermore, the process of manufacturing the screen 110 with the composition guides 112,114 is very different in that during the molding process of making the screens 110, the composition guides 112,114 or others such as those providing the likely crop image of the 5×7 image or the wallet sized image, etc., can be provided. Although the molded line 120 is illustrated somewhat curved, it could have square corners, planar portions, etc.

FIG. 8 also shows a dual crop line design where first molded guide line 120 has a second molded guide line 121 external thereto. This can be beneficial to add compromising tolerances while cropping. For head box crop lines 120, 121 as illustrated, this technique can allow individual users to scale up or down with their own preferences of smaller using the inside lines 120 or larger using the outside lines 121. These lines can be extremely thin. Lines 117 and 119 are provided relative to the lines 113 and 115 to show similar technique relative to the 8×10 image area and the non-printed areas 116 and 118. "Dual crop lines" could be adapted for use in the embodiments shown in FIGS. 4a, 4b, 6 or others. Single crop lines can be used for many embodiments as well.

Figure 9:
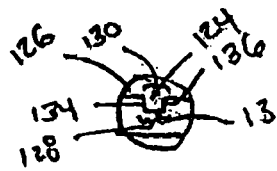
FIG. 9 is a cross-sectional view of the area marked "A" in FIG. 8 in a first alternatively preferred embodiment of the present invention shown in FIG. 8.

FIG. 9 shows a first alternatively preferred embodiment with a line 124 molded in a recessed manner relative to surface 126. This embodiment differs from the prior art of FIG. 12 in that the line 124 is molded into rather than etched into the surface 126. This is believed to have the advantage of providing a wider width 128, with the width 128 at base 132 has approximately the same width 130 of the line 124 at the surface 126. Furthermore, instead of meeting at a point at the bottom of groove due to the nature of etching with a diamond or metal tip as shown in FIG. 12, the base 132 of line 124 is planar and meets the walls 134,136 at perpendicular angles. In other embodiments, these angles may differ and the walls 134,136 and/or the base 132 may be curved and not even meet at distinguishable angles as illustrated.

FIG. 11 shows a cross section of a second alternatively preferred embodiment of a line 150 which has been printed onto surface 152 of the camera screen 110. The advantage of printing or painting over etching is that any of a plurality of colors different from the material constituting the screen 110 can be utilized (i.e., such as red on an opaque or clear background) or any other colors such as yellow, blue, etc., on a background of distinguishable color. Furthermore, the printing or painting techniques shown in FIG. 11 can be utilized in conjunction with the molding techniques shown in FIGS. 9 and 10. As shown in FIG. 10, a color 121 is printed atop the molded line 120. Similarly, a printed or painted line could occur in the line 124. Furthermore, printing could be used in conjunction with the prior art etching technique by filling at least a portion of the groove 106 with ink, paint or other colored material decal or image print transfer. By clearly providing lines, designs, patterns into other areas using coloring processes and/or direct molding for camera screens 110 or other viewer and/or display parts, the photographer is provided with additional benefit of utilizing a composition guides 112,114 or otherwise to assist his/her photo taking skills to provide high quality images.

It will be obvious to one skilled in the art that when providing screens with molded lines 120,124, replacement screens 110 can be utilized. However, when printing or painting as shown in FIGS. 5 and 6, printing can be utilized together with existing or replacement screens 110. Some camera manufacturers may elect in the future to provide composition guides.

Additionally, in still other alternative embodiments, the molded and/or printed and/or projected screens 110 can be utilized in conjunction with LCD displays, monitors, TV screens or other devices utilized in conjunction with cameras to assist a photographer in composing images for later display and viewing as they are likely to appear when cropped or to provide consistent images.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A camera having:
   a lens;
   an image capturing device having a predetermined image capture area;
   a viewing location; and
   a composition guide having a first crop area which is displayed at the viewing location and has a smaller area than the image capture area, wherein the first crop area of said composition guide is formed to have an elevation above and external to an exterior planar surface of an insert intermediate at least a portion of the lens and at least a portion of the viewing location; wherein the insert is a camera screen and wherein the camera screen has a Fresnel side and the exterior planar surface with the composition guide is located opposite the Fresnel side.

2. The camera of claim 1 wherein said first crop area corresponds to at least one of a ratio of 5×7, 8×10, 3.5×5 and wallet sized prints.

3. The camera of claim 2 wherein the composition guide further comprises a second crop area; said first crop area corresponding to 8×10 oriented in a vertical mode and the second crop ratio selected from at least one of a horizontal orientation mode and a wallet sized crop ratio centered relative to the first crop area with the second crop area as having an elevation above the exterior planar surface of the insert; and the first and second crop areas simultaneously provided.

4. The camera of claim 1 wherein the composition guide has an applied layer thickness.

5. The camera of claim 1 wherein the first crop area is at least substantially centered relative to the image capture area, the image capture area has a ratio of 8×12 and the first crop area has a ratio of no greater than 5×7 or 8×10.

6. The camera of claim 1 wherein the viewing location is at least one of an LCD display and a viewer.

7. The camera of claim 1 wherein the image capture area is at least substantially rectangular and the first crop area is oriented with a shorter width than height with the camera in a landscape orientation.

8. A camera having
   a lens;
   an image capturing device having a predetermined image capture area;
   a viewing location; and
   a composition guide having a first crop area which is displayed at the viewing location and has a smaller area than the image capture area, wherein the first crop area of said composition guide is formed to have an elevation above and external to an exterior planar surface of an insert intermediate at least a portion of the lens and at least a portion of the viewing location, and wherein the composition guide is molded relative to the exterior planar surface of the insert.

9. The camera of claim 8 further comprising a colored material painted on the insert at the composition guide.

10. The camera of claim 9 wherein the insert is a camera screen.

11. The camera of claim 10 wherein a first side of the insert is a substantially planar surface and the first crop area extends an elevation at least one of above and below the substantially planar surface.

12. The camera of claim 8 wherein the first crop area provides an 8×10 ratio and further comprising a second crop area at least one of orthogonally oriented relative to the first crop area and centered relative to the first crop area.

13. The camera of claim 8 wherein the first crop area has a ratio selected from the group of 8×10, 5×7, and wallet sized ratio.

* * * * *